(12) United States Patent
Lachance et al.

(10) Patent No.: US 11,156,504 B2
(45) Date of Patent: Oct. 26, 2021

(54) REFERENCE TEMPERATURE BLOCK

(71) Applicant: PRATT & WHITNEY CANADA CORP., Longueuil (CA)

(72) Inventors: Pierre-Luc Lachance, Brossard (CA); Parham Zabeti, Toronto (CA); Joao Desouza, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 176 days.

(21) Appl. No.: 16/534,223

(22) Filed: Aug. 7, 2019

(65) Prior Publication Data

US 2021/0041303 A1 Feb. 11, 2021

(51) Int. Cl.
*G01K 1/16* (2006.01)
*G01K 7/02* (2021.01)
*G01K 1/00* (2006.01)
*G01K 13/00* (2021.01)

(52) U.S. Cl.
CPC ....... *G01K 1/16* (2013.01); *G01K 7/02* (2013.01)

(58) Field of Classification Search
USPC .................................. 374/134, 179, 208, 144
See application file for complete search history.

(56) References Cited

U.S. PATENT DOCUMENTS

| | | | | |
|---|---|---|---|---|
| 7,303,331 B2* | 12/2007 | Heyworth | ............. | G01J 5/0088 374/121 |
| 2008/0095212 A1* | 4/2008 | Jonnalagadda | ....... | G01J 5/0003 374/124 |
| 2018/0254580 A1 | 9/2018 | Goulds | | |
| 2019/0309646 A1* | 10/2019 | Cho | ...................... | F01D 17/085 |

* cited by examiner

*Primary Examiner* — Mirellys Jagan
(74) *Attorney, Agent, or Firm* — Norton Rose Fulbright Canada LLP

(57) ABSTRACT

A method of measuring a temperature of a part during an assembly process comprises reading the temperature via a reference block that is independently exposed to a same heat source as the part to be monitored.

19 Claims, 5 Drawing Sheets

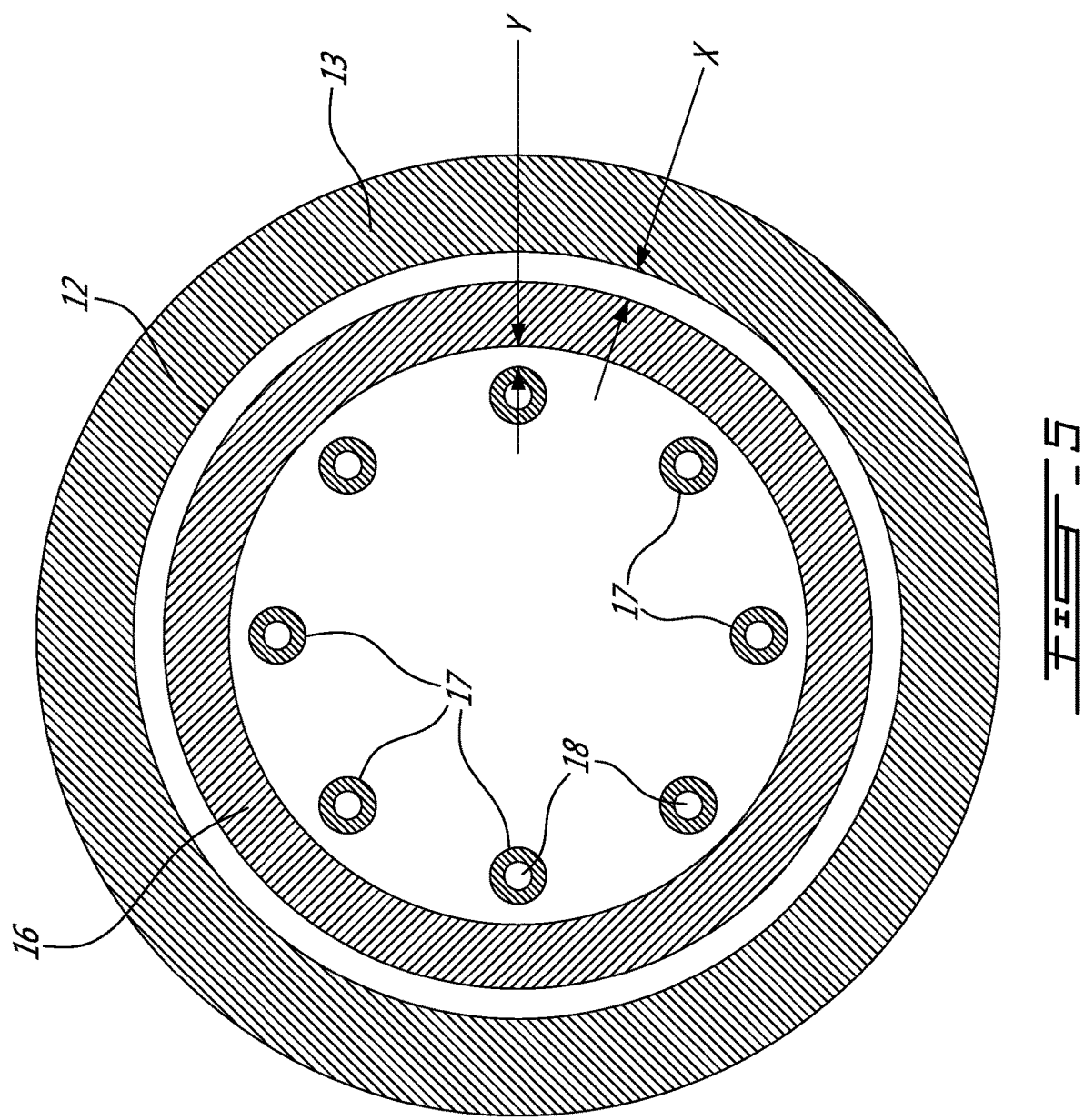

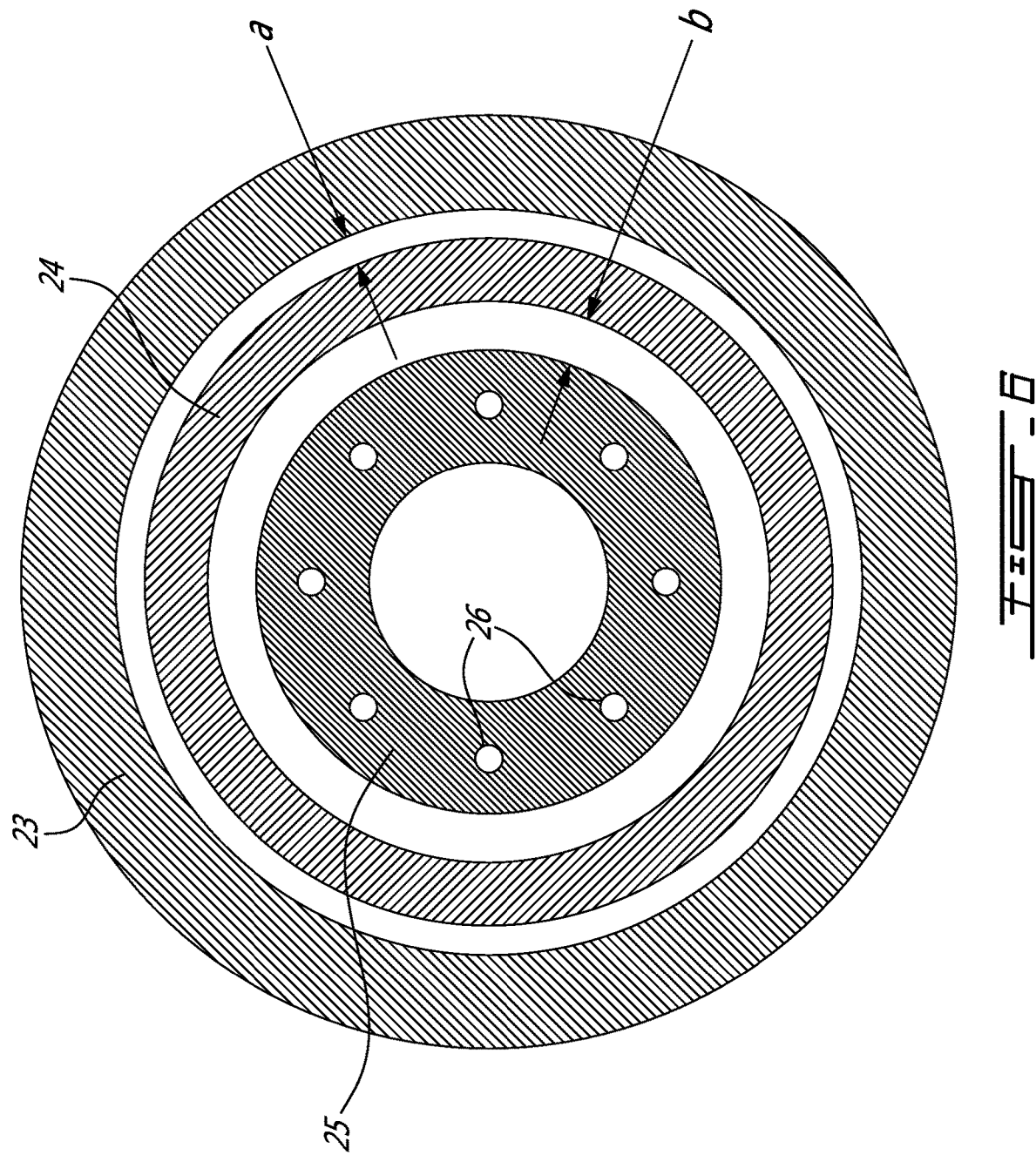

REFERENCE TEMPERATURE BLOCK

TECHNICAL FIELD

The disclosure relates to a device and a method of measuring the heating or cooling of a part during a manufacturing process.

BACKGROUND

Assembly of parts for engines and machines can include heating of the part to expand the part dimensions or reduce the strength of the material, or conversely to cool and shrink the part dimensions. For example, bearings and other ring shapes are machined to a selected diameter at room temperature and then exposed to heat. The heat expands the diameter to an assembly diameter which allows press fitting or other assembly processes to be carried out. After assembly, the part is cooled and shrunken to a finished diameter. As a result, the assembled parts retain a level of residual stress (i.e.: compression and tension) and are bonded together with an interference fit.

Controlling the heat transfer process can include the fitting of temperature sensors to the part that is to be heated or cooled. Bimetallic thermocouple sensors rely on the accurate transfer of thermal energy from the part to the thermocouple. Thermal energy transfer requires an intimate physical connection between part and the thermocouple to provide accurate and repeatable temperature measurements.

In manufacturing processes, a good quality connection may be difficult to achieve reliably and variation in temperature measurements may occur. Connections may be necessary in areas of the part that have limited access. Installation and removal of the thermocouple connection adds to the steps to the manufacturing process. The part may radiate or absorb heat energy during the time taken for removal which results in variations in the part dimensions during assembly. Improvement is thus desirable.

SUMMARY

The disclosure describes a method of determining a temperature of a portion of a part during a manufacturing process, the method comprising: disposing a heat transfer device a first distance from the portion of the part; disposing a reference block a second distance from the device; actuating the heat transfer device to heat or cool the portion of the part and the reference block; reading the measured temperature of the reference block using a temperature sensor; and estimating the temperature of the portion of the part by comparing the measured temperature of the reference block to a predetermined empirical data correlation set.

In accordance with another general aspect, there is provided a method of indirectly determining a temperature of a portion of a part, the method comprising: disposing a heat transfer transfer device a first distance from the portion of the part; disposing a reference block a second distance from the heat transfer device, the reference block comprising a temperature sensor disposed in a central zone of a thermally absorptive mass; actuating the heat transfer device to heat or cool the portion of the part and to heat or cool the reference block; determining a measured temperature of the central core using the temperature sensor; and estimating the temperature of the portion of the part by comparing the measured temperature of the central core to a predetermined empirical data set; wherein the predetermined data set correlates a range of previously measured temperatures of the central core to a range of previously measured temperatures of a substantially identical test portion of a substantially identical test part; and wherein the predetermined empirical data set is generated, prior to the disposing steps, with the heat transfer device disposed the first distance from the substantially identical test portion of the substantially identical test part and with the reference block disposed the second distance from the heat transfer device. Embodiments can include combinations of the above features.

In accordance with a still further general aspect, there is provided a device for indirectly estimating a temperature of a portion of a part, the device comprising: a heat transfer device disposed a first distance from the portion of the part; at least one reference block disposed a second distance from the thermal energy transfer device, the at least one reference block having a thermally absorptive mass and a temperature sensor mounted to the thermally absorptive mass; and a control system for receiving a measured temperature from the temperature sensor and for comparing the measured temperature of the at least one reference block to a predetermined empirical data set.

Any of the above features may be used together, in any combination. Further details of these and other aspects of the subject matter of this application will be apparent from the detailed description included below and the drawings.

DESCRIPTION OF THE DRAWINGS

FIG. 5 is a schematic sectional view along line 5-5 of FIG. 2 showing a ring shaped annular part, a coaxial nested ring shaped heat transfer device and a circumferentially spaced apart array of eight cylindrical reference temperature blocks. Any number of RTB's may be used as required, from one to many.

FIG. 6 shows an alternative sectional view like FIG. 5 but where the reference block comprises an internal coaxial ring with eight bores spaced about the midline thickness to house eight thermocouples. Any number of thermocouples may be used into any amount of holes disposed in any manner, symmetrical or not.

DETAILED DESCRIPTION

Figure 1:
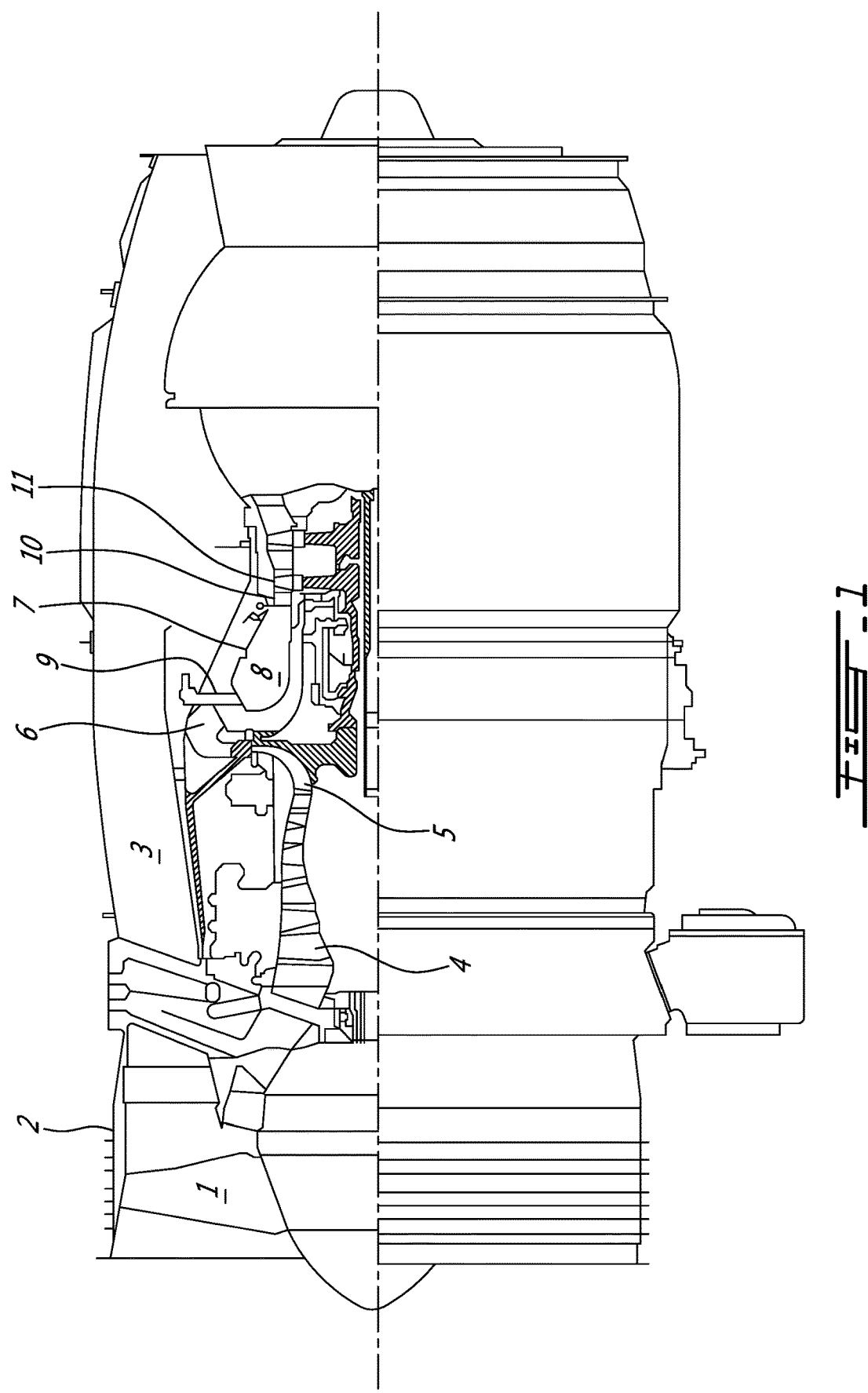
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
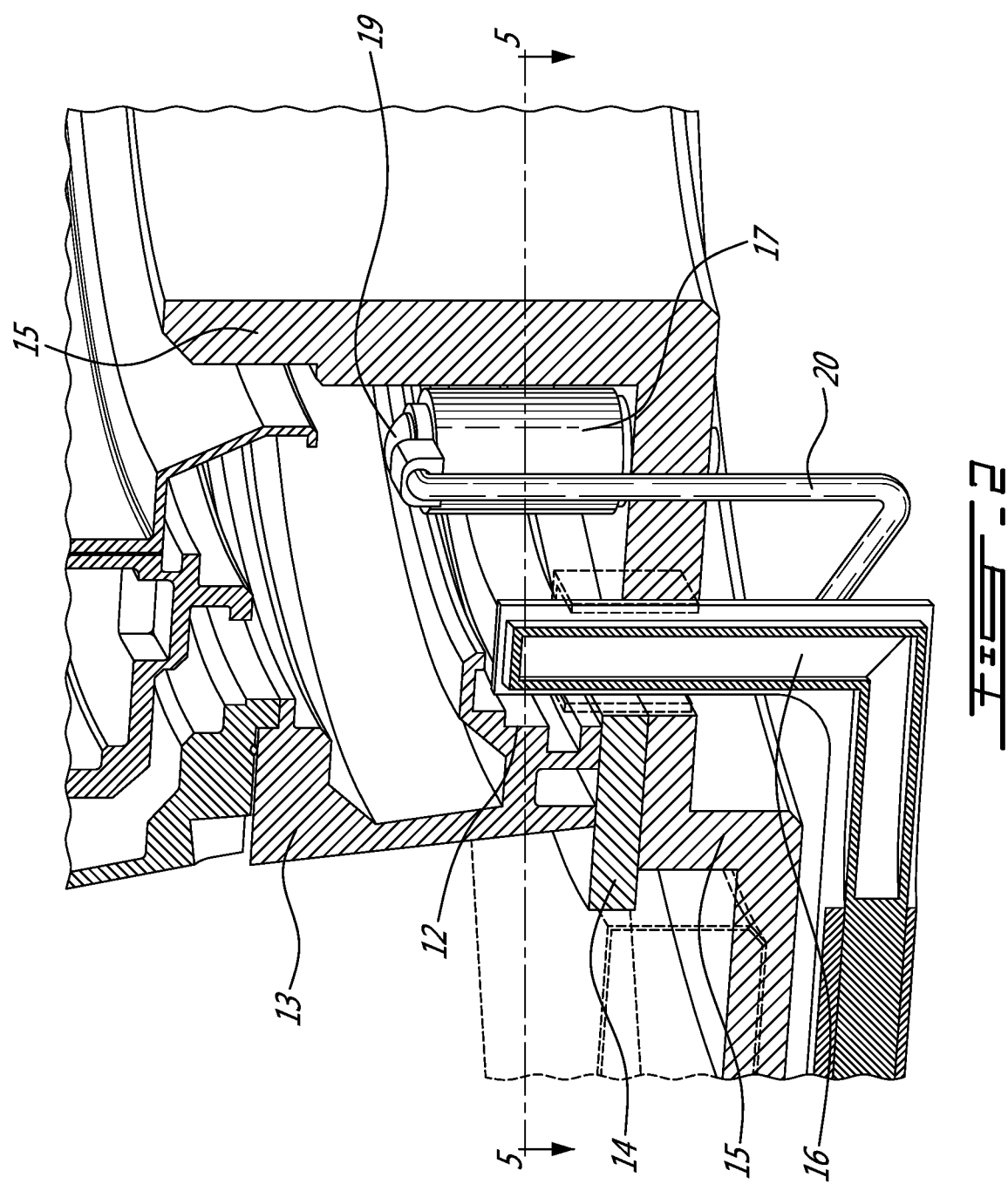
FIG. 2 is a partial axial-radial sectional view through an example annular part, a heat transfer device and a reference temperature block in a positioning jig to heat or cool a selected portion of the annular part.

FIG. 2 illustrates an example device for indirectly estimating a temperature of an interior cylindrical surface 12 of an annular engine part 13. The device can include a positioning jig to hold the part 13 such as the base ring 14 and support ring 15 shown in FIG. 2. The positioning jig includes a heat transfer device 16 such as an induction heater using electromagnetic energy, a hot air heater, or an electrical resistance heater. The device 16 could also be a chiller or cooling device which would shrink the dimensions of the interior cylindrical surface 12. However, for the sake of simplicity, the present description will refer to a heating process which is generally more commonly used.

FIG. 5 shows a sectional view along line 5-5 of FIG. 2. In the example shown, the interior cylindrical surface 12 and the device 16 are coaxial or concentric nested rings that are spaced apart radially by a first distance "x". A circumferentially spaced apart array of reference temperature blocks (RTB) 17 is shown in FIG. 5 that are each disposed a second distance "y" from the heat transfer device 16. In the example shown in FIGS. 2, 3, and 5, each reference block 17 is a cylindrical block with a central bore 18 (best seen in FIG. 3). The reference temperature block are temporarily mounted to the jig for the sole purpose of indirectly measuring the temperature of the engine part to be heated or cooled.

FIG. 2 shows the cylindrical reference block 17 disposed in the positioning jig with a temperature sensor 19 fixed to the top of the RTB 17 using a screw in the central bore 18 of the thermally absorptive mass of the cylindrical reference temperature block 17. The thermally absorptive mass can be metal, ceramic or various other heat resistant materials. A conduit 20 from the temperature sensor 19 communicates with a control system (not shown) to provide a signal indicative of the temperature measured on the surface of the cylindrical reference block 17. The example of FIG. 5 does not show the conduits 20 nor the temperature sensors 19, however it will be understood that any convenient number of temperature sensors 19 can be mounted to reference temperature blocks 17. As indicated in FIG. 5, spacing of the cylindrical reference blocks 17 provides a plurality of temperature sensors 19 in a circumferentially spaced apart array which can indicate if a segment area of the heat transfer device 16 is malfunctioning or if heat distribution is not uniform.

The heat transfer device 16 includes an actuator to heat or cool the interior cylindrical surface 12 of the part 13 and to heat or cool the cylindrical reference block 17 simultaneously. The heat transfer device 16 radiates heat or electromagnetic field in all directions. A control system (not shown) receives measured temperatures from the temperature sensors 19, which are fixed to each RTB 17. The control system then compares the measured temperatures of the central cores to a predetermined empirical data set stored in memory. The predetermined data set correlates a range of previously measured temperatures of the central cores of each RTB 17 to a range of previously measured temperatures conducted using a substantially identical test portion of a substantially identical test part. The predetermined empirical data set is generated in an experimental testing stage prior to the deployment of the positioning jig for use in manufacturing. The data set is empirically derived with the device 16 disposed at the first distance "x" from a substantially identical annular test part 13 having material properties, dimensions and interior cylindrical surface 12 substantially identical to the annular parts 13 to be manufactured. The temperature of the interior cylindrical surface 12 of the test part can be measured directly by connecting thermocouples or temperature sensors to the interior cylindrical surface 12 of the test part. The data set is generated also with the reference block(s) 17 disposed the second distance "y" from the heat transfer device 16. For example, the data set can represent a digital chart or table of recorded test data showing a correlation between the actual temperature measured by thermocouples connected to the interior cylindrical surface 12 and the corresponding measured temperature of the central cores of each cylindrical reference block 17. A comparison between the actual measured temperature the interior cylindrical surface 12 during the generation of the data set to the measured temperature of each cylindrical reference block 17 can be used to estimate the temperature of the interior cylindrical surface 12 during manufacturing. By measuring the temperature of each cylindrical reference block 17 without connecting thermocouples to the interior cylindrical surface 12 of a manufactured part, the temperature of the interior cylindrical surface 12 can be estimated using the positioning jig provided that dimensions x and y remain constant along with all other variables of the position jig.

Accordingly the present description provides a method of indirectly determining a temperature of a portion (interior cylindrical surface 12) of a part, such as the annular part 13 illustrated. As seen in FIG. 2, for example a positioning jig with a base ring 14 and a support ring 15, is used to generate a predetermined empirical data set, prior to deployment for manufacturing. The heat transfer device 16 is disposed the distance "x" from a substantially identical interior cylindrical surface 12 portion of a test part 13 and the reference block(s) 17 is disposed the distance "y" from the heat transfer device 16. According to one embodiment, the test part is the real engine part. The distance x, y and all other dimensional parameters during the generation of the data set remain constant so that the core temperatures of the cylindrical reference blocks 17 during data set generation can be reproduced accurately during manufacturing.

As seen in FIGS. 2 and 5, each cylindrical reference block 17 has a temperature sensor 19 mounted to a thermally absorptive mass. The reference blocks 17 have sufficient wall thickness to absorb thermal energy within a period of time sufficient to represent the thermal energy absorption of the annular part 13. It will be understood that for different parts 13, a different arrangement and dimensions of reference blocks 17 may be required. However, once a positioning jig and data set have been established empirically, the positioning jig with heat transfer device 16 and reference blocks 17 remain locked in position.

Once the data set has been generated during initial experimental tests, estimating the temperature of the interior cylindrical surface 12 of the annular part 13 during manufacture begins by actuating the heat transfer device 16 to heat or cool the portion 12 of the part 13 and to heat or cool the reference block(s) 17 at the same time.

A measured temperature of the central cores of each reference block 17 is recorded using the temperature sensors 19. The temperature of the interior cylindrical surface 12 of the annular part 13 can be estimated by comparing the measured temperatures to the predetermined empirical data set. The predetermined data set correlates a range of previously measured temperatures of the central cores of the reference blocks 17 to a range of previously measured temperatures of a substantially identical test surface 12 of a test part 13. The predetermined data set is generated using the positioning jig with the heat transfer device 16 mounted in the positioning jig the distance "x" from the substantially identical test surface 12 of the test part 13 and the reference blocks 17 mounted in the jig the distance "y" from the heat transfer device 16.

Figure 4:
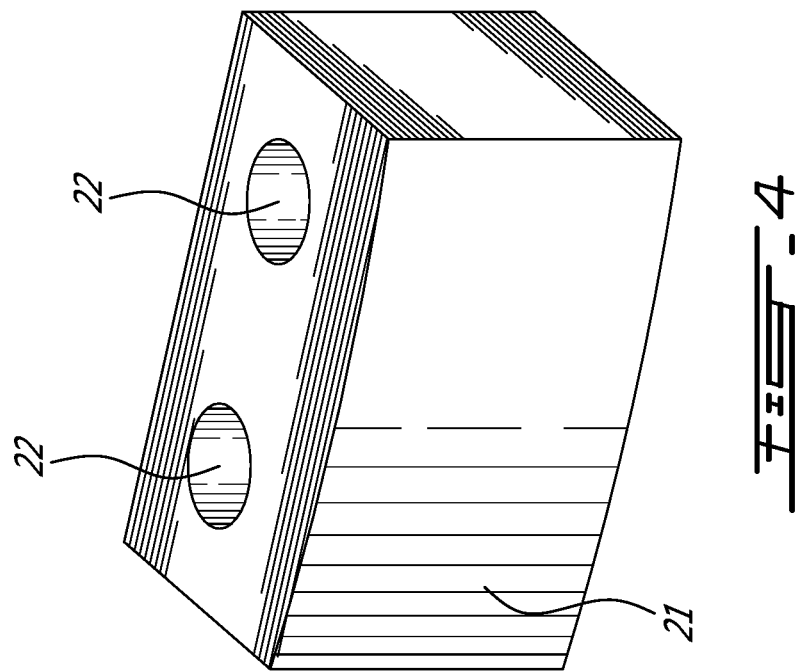
FIG. 4 is an isometric detail view of an alternative reference block with a segmental shape and two bores to fix two thermocouple temperature sensors.
Figure 3:
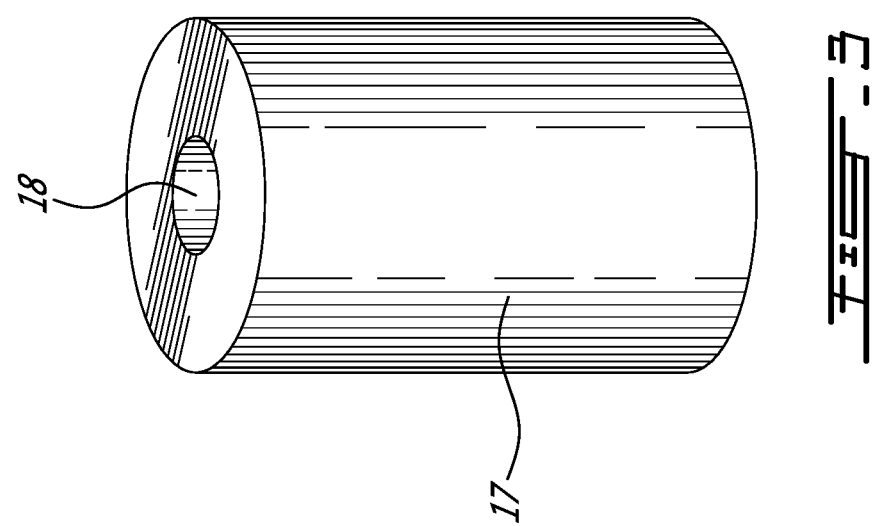
FIG. 3 is an isometric detail view of the reference block of FIG. 2 with a central bore to house the fastener (e.g. the screw) that will fix the thermocouple temperature sensor to the reference temperature block (RTB). This same hole may be used to fix the RTB to the jig.

Referring to FIG. 3 the central zone of the thermally absorptive mass of the cylindrically shaped reference block 17 is shown as the center of gravity. FIG. 4 shows an alternative segmental reference block 21 having a thermally absorptive mass with two bores 22 in a central zone for mounting two temperature sensors 19 on a midline of the wall thickness. The segmental reference blocks 21 can be used in a circumferentially spaced apart array or can be assembled end-to-end into an annular ring.

FIG. 6 shows a further alternative where the annular part 23 and thermal energy device 24 are coaxial rings spaced apart by dimension "a". An annular reference block 25 is coaxial and spaced from the thermal energy device by a dimension "b". In the illustrated example, the annular reference device 25 has eight bores 26 circumferentially spaced apart along a midline wall thickness or central wall zone to house eight temperature sensors (not shown).

The above description is meant to be exemplary only, and one skilled in the relevant arts will recognize that changes may be made to the embodiments described without departing from the scope of the invention disclosed. Any of the above described features may be used together, in any combination. The present disclosure may be embodied in other specific forms without departing from the subject matter of the claims. The present disclosure is intended to cover and embrace all suitable changes in technology. For instance, while the present invention has been described in the context of a gas turbine engine manufacturing process, it is understood that the same principles could be used in any industry using heating and heat measurements during a manufacturing process. Therefore, the image and description of a turbine engine is not very pertinent. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of determining a temperature of a portion of a part during a manufacturing process, the method comprising:
    disposing a heat transfer device at a first distance from the portion of the part;
    disposing a reference block at a second distance from the heat transfer device;
    actuating the heat transfer device to heat or cool the portion of the part and the reference block;
    determining a measured temperature of the reference block using a temperature sensor; and
    estimating the temperature of the portion of the part by comparing the measured temperature of the reference block to a predetermined empirical data correlation set.

2. The method of claim 1, wherein the predetermined empirical data correlation set is generated, prior to the disposing steps, with the heat transfer device disposed at the first distance from the portion of the part and with the reference block disposed at the second distance from the heat transfer device.

3. The method according to claim 1, wherein the portion of the part and the heat transfer device comprise coaxial nested rings, and wherein the reference block includes a plurality of temperature sensors in a circumferentially spaced apart array.

4. The method of claim 1, wherein the predetermined empirical data correlation set correlates a range of previously measured temperatures of the reference block to a range of previously measured temperatures of a test portion of a test part.

5. The method according to claim 4, wherein the predetermined data set is generated using a jig, wherein the heat transfer device is mounted in the jig at the first distance from the portion of the part and the reference block is mounted in the jig at the second distance from the heat transfer device.

6. The method according to claim 1, wherein disposing the heat transfer device at the first distance from the portion of the part includes mounting the heat transfer device and the part to a jig.

7. The method according to claim 6, wherein disposing the reference block at the second distance from the heat transfer device includes mounting the reference block to the jig.

8. The method according to claim 1, wherein the temperature sensor is disposed in a central zone of a thermally absorptive mass of the reference block.

9. The method according to claim 8, wherein the central zone is a center of gravity of the thermally absorptive mass or a midline thickness of the thermally absorptive mass.

10. The method according to claim 9, wherein the reference block has a shape selected from the group consisting of: a cylinder, an annular ring, and a segment of an annular ring.

11. A device for indirectly estimating a temperature of a portion of a part, the device comprising:
    a heat transfer device disposed at a first distance from the portion of the part;
    at least one reference block disposed at a second distance from the heat transfer device, the at least one reference block having a thermally absorptive mass and a temperature sensor mounted to the thermally absorptive mass; and
    a control system for receiving a measured temperature from the temperature sensor and for comparing the measured temperature of the at least one reference block to a predetermined empirical data set.

12. The device according to claim 11, further comprising: a positioning jig, wherein the heat transfer device is mounted in the jig at the first distance from the portion of the part and the at least one reference block is mounted in the jig at the second distance from the heat transfer device.

13. The device according to claim 11, wherein the temperature sensor includes a bimetallic thermocouple.

14. The method according to claim 11, wherein the temperature sensor is mounted in alignment with a center of gravity of the thermally absorptive mass or a midline thickness of the thermally absorptive mass.

15. The device according to claim 11, wherein the at least one reference block is provided in the form of a cylinder, an annular ring, or a segment of an annular ring.

16. The device according to claim 11, wherein the portion of the part and the heat transfer device comprise coaxial nested rings, and wherein the at least one reference block includes a plurality of temperature sensors in a circumferentially spaced apart array.

17. The device according to claim 11, wherein the at least one reference block comprises a circumferential array of reference blocks coaxially disposed relative to the heat transfer device and the portion of the part.

18. The device according to claim 11, wherein the predetermined empirical data set correlates a range of stored measured temperatures of a central zone of the at least one reference block to a range of stored measured temperatures of a test portion of a test part.

19. The device according to claim 18, wherein the predetermined empirical data set is generated with the heat transfer device disposed at the first distance from the test portion of the test part and with the at least one reference block disposed at the second distance from the heat transfer device.

* * * * *